UNITED STATES PATENT OFFICE.

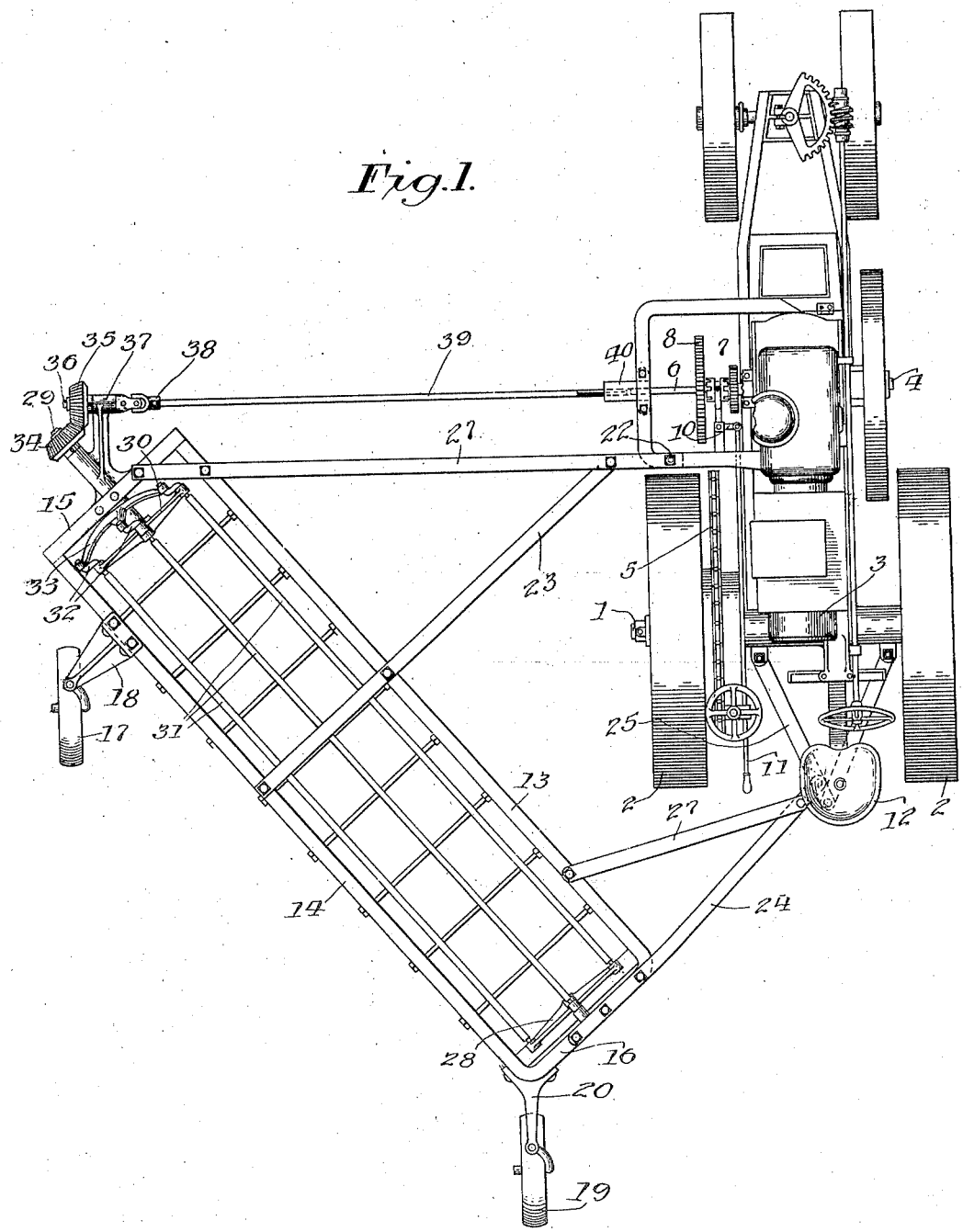

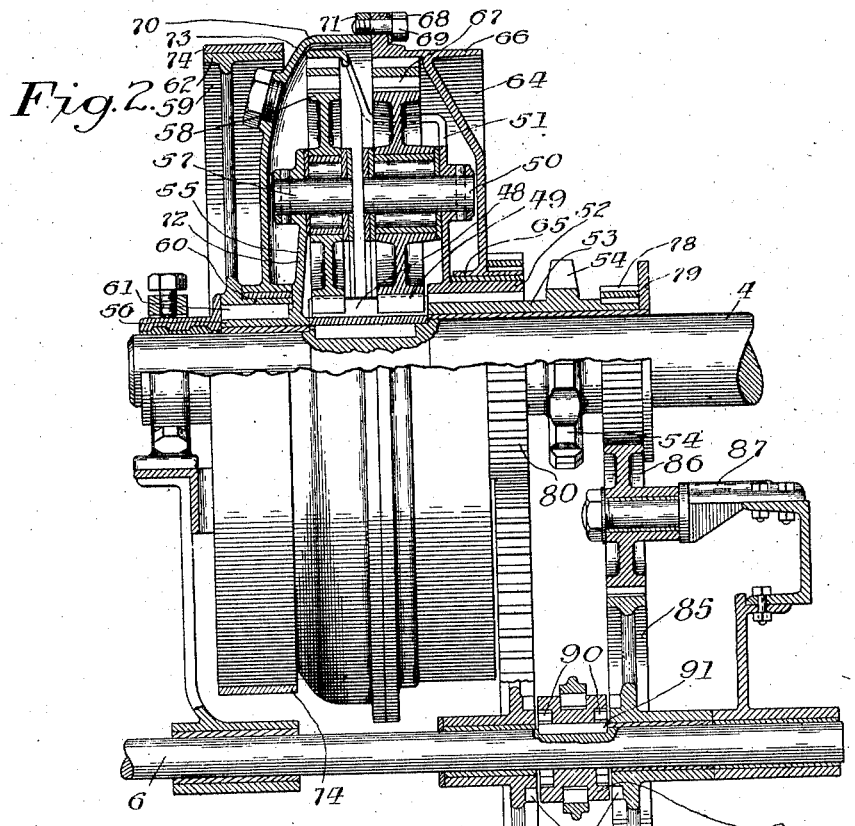

EDWARD W. BURGESS, OF CHICAGO, ILLINOIS, ASSIGNOR, BY MESNE ASSIGNMENTS, TO INTERNATIONAL HARVESTER COMPANY, A CORPORATION OF NEW JERSEY.

TRACTOR-OPERATED HAY-TREATING DEVICE.

1,291,392.

Specification of Letters Patent. Patented Jan. 14, 1919.

Application filed October 25, 1915. Serial No. 57,717.

*To all whom it may concern:*

Be it known that I, EDWARD W. BURGESS, a citizen of the United States, residing at Chicago, in the county of Cook and State of Illinois, have invented certain new and useful Improvements in Tractor-Operated Hay-Treating Devices, of which the following is a full, clear, and exact specification.

My invention relates to tractor operated hay treating devices, such, for example, as hay rakes.

The object of this invention is to accomplish the efficient propulsion and operation by and from a tractor.

Another object is to provide a construction of rake frame and operative parts that may be connected with a tractor in offset and trailing relation and have its raking elements driven by means of operative connections with the power transmission gearing of the tractor and eliminating the tractive power elements from the rake structure.

I have illustrated one embodiment of my invention in the accompanying drawings and in these drawings,—

Figure 1 shows a top plan view of a tractor having a side delivery rake connected thereto;

Fig. 2 is an enlarged detail view partly in section, of the power transmission gearing between the engine shaft and the rake operating mechanism and traction wheels of the tractor; and Fig. 3 is a detail side elevation of a portion of the tractor showing the relative positions of the engine shaft and the counter shaft which transmits the power from the engine to the rake.

The tractor includes a truck frame supported at its rear end upon an axle 1 having traction wheels 2 mounted thereon, an engine including a power cylinder 3, and an engine shaft 4. The power transmission gearing between the engine shaft and the traction wheels may have the form shown in Figs. 2 and 3 and includes a driving sprocket chain 5. 6 represents the supplemental countershaft adapted to be driven by the engine shaft through either of two gear wheels 7 or 8 journaled upon the countershaft at the right and left, respectively, of a slidable clutch member 9 mounted upon the shaft and adapted to selectively engage either of the gear wheels, its opposite end being controlled by a forked bell crank lever 10 that is controlled by a rod 11 extending rearward within convenient reach of the operator from the seat 12.

The power transmission gearing for transmitting the power from the engine shaft to the counter shaft which operates the rake shaft is illustrated in detail in Fig. 2 and will now be described.

The same transmission gear is utilized to transmit the power to the traction wheels of the tractor and this description therefore will also include the driving mechanism for the traction wheels.

Power is transmitted from the engine shaft to the traction wheels by means including a pinion 48 secured to the engine shaft 4 and meshing with an orbital gear 49 journaled on the stud 50 secured to one arm 51 of a three-armed spider, the arms of which radiate from a hub 52 whereby it is secured to one end of a sleeve 53 that is journaled upon the crank shaft 4 at one end of the pinion 48. A driving sprocket 54 is formed integral with the body of the sleeve 53 and power is transmitted to the traction wheels by means of a chain 5 which connects the driving sprocket 54 with a corresponding sprocket carried by the main axle of the tractor. A disk-like carrier 55 is provided with a hub 56 journaled upon the shaft 4 at the opposite end of the pinion 48. A series of studs 57, preferably three in number, is secured to the carrier and each stud has journaled upon the same a rotatable gear 58 which meshes with the pinion 48. A wheel 59 is provided with a hub 60 which is secured by means of a key 61 to hub 56. This wheel is also provided on its outer periphery with a rim 62. One member 64 of a two-part casing 63 is provided with a hub 65 which is journaled upon the hub 52 and also provided with a rim 66 having an internal gear ring 67 which meshes with the gear 49. This member 64 is also provided with a peripheral flange 68 which is secured by means of bolts 69 to the member 70 which forms the other portion of the two-part casing and has a corresponding peripheral flange 71, the flanges 68 and 71 being bolted together. The member 70 is also provided with a hub 72 which is journaled upon the hub 60 of the wheel 59. A gear ring 73 is carried by the arms 51 and meshes with the gears 58 mounted upon the carrier 55. Friction band mechanism 74 (see Fig. 3) is adapted to operatively engage with the rims 62 and 66 and is controlled by the operator by means of suitable hand levers. The power transmission mechanism described is a common form of direct and reverse plunger gear driving mechanism.

The driving connections for the countershaft will now be described.

The counter shaft as above set forth is journaled on the tractor frame and is disposed parallel with the engine shaft and is located in a plane below the engine shaft, as clearly shown in Fig. 3. The means for transmitting motion to the countershaft is operative whether the tractor is moving or is stationary, and includes a gear 78 secured to the inner end of the sprocket sleeve 53, a collar 79 being mounted on the sleeve between the gear and the engine frame. A gear 80 is secured to the hub 65 of the casing 64. The gear 78 meshes with an intermediate pinion 86 journaled upon a bracket member 87 secured to the tractor frame and the intermediate union 86 meshes with a gear wheel 7 journaled upon the countershaft. The gear 80 meshes with a gear wheel 8 also journaled on the counter shaft. The opposing ends of the hubs of the gear wheels 7 and 8 are provided with clutch teeth 89 which are adapted to engage with the corresponding teeth 90 carried by clutch sleeve 9 secured to the countershaft 6 by means of a key 91. This clutch sleeve is operated by means of a forked bell crank lever 10 that is controlled by the rod 11 extending rearward within convenient reach of the operator.

In operation, with the engine running idle, the crank shaft transmits motion through the pinion 48 to the orbital gear wheels 49 and 58, then to the casing 63 through the orbital gears 49 and the gear ring 67, and through the gear ring 73 and gear wheels 58 to the carrier 55 and wheel 59. When the casing is held against rotation by means of the friction band mechanism the orbital gear wheels 49 engaging with the gear ring 67 and arms 51, will be carried around the axis of the engine crank shaft thereby rotating the sleeve 53 in a forward direction and the gear wheels 7 on the countershaft 6 through the intermediate pinion 86 and the gear wheel 78 in the same direction and the tractor moves forward driven by the sprocket chain. If the friction band mechanism is caused to hold the wheel 59 against rotation the orbital gear wheels 58 will turn the gear ring 73 about the axis of the engine shaft, thereby rotating the gear supporting arms 51 and the sleeve 53 in a direction to reverse the movement of the traction wheels. When the tractor is held stationary by means of the brake mechanism the sprocket wheel 54 holds the sleeve 53 and the arms 51 against rotation and the orbital gear 49 through the gear ring 67 will impart rotative movement to the casing 63 about the axis of the crank shaft and the gear 80 rotates the gear wheel 8 while the tractor is held stationary and the countershaft becomes available for transmitting the power to the hay rake which is also stationary.

The hay treating device or rake includes a rectangular frame disposed at one side of the tractor and inclined forward and outward relative to the line of draft, and including front and rear frame members 13 and 14, respectively, and front and rear end members 15 and 16, respectively. The front of the frame is supported by means of a trailing caster wheel 17 connected with the frame member 14 by means of a bracket member 18, and its rear end by a similar caster wheel 19 connected with a bracket member 20 secured to the rear corner of the frame. 21 represents a transversely disposed draft member having one end secured to the end member 15 and to the front end of the frame member 13, and its opposite end detachably connected with the truck frame of the tractor, as by means of a coupling pin 22, and 23 represents a supplemental draft frame member having its rear end secured to the middle part of the frame members 13 and 14 and its front end to the draft member 21 near its connection with the tractor. 24 represents a draft member having its rear end secured to the end frame member 16, and its front end detachably connected with the draft frame 25 of the tractor, as by means of a coupling pin 26, and 27 represents a diagonally disposed brace member having its rear end secured to the frame member 13 and its front end to the front end of the draft member 24.

The raking elements have a common form, and include a raking cylinder 28 having an axial shaft 29 journaled in bearings secured to the end members of the rake frame and having spider arms 30 secured thereto, and carrying rake tooth carrying bars 31 at their free ends that are provided with crank arms 32 at their front ends that are operatively connected with a controlling spider 33 journaled upon the rake carrying frame eccentric to the axis of the shaft 29 in a common way.

Means for transmitting motion to the raking cylinder include a gear 34 secured to the front end of the shaft 29 and meshing with a pinion 35 secured to one end of a transversely disposed shaft 36 journaled in a bearing 37 carried by the rake frame and having a coupling member 38 secured to its opposite end whereby it is preferably flexibly connected with one end of a transversely disposed shaft 39, having its opposite end connected, by means of a spline, with a coupling sleeve 40 secured to the extended end of the supplemental countershaft 6 of the power transmission gearing of the tractor.

In operation, the raking elements are driven independently from the gearing upon the tractor and controlled by the operator by means of the clutch mechanism. The windrow is delivered in rear of the tractor and the rake may be quickly coupled with or detached from the latter.

Having shown and described a preferred embodiment of my invention, I do not wish that it be limited to the specific details of the structure as illustrated, it being understood that changes may be made in the form and arrangement of its parts without departing from the spirit of the invention as indicated in the appended claims.

What I claim as my invention, and desire to secure by Letters Patent, is:

1. In combination, a motor operated vehicle having power transmission mechanism, a frame carrying a raking element, members whereby the rake frame may be coupled to the motor operated vehicle, and means for operatively connecting said raking element with the power transmission mechanism of the tractor to give said rake element a raking action.

2. In combination, a motor operated vehicle having power transmission mechanism, a frame carrying a raking element, members for coupling said rake frame to the motor operated vehicle, and clutch controlled means for operatively connecting said raking element to the power transmission mechanism of the motor operated vehicle to give said raking element a raking action.

3. In combination, a motor operated vehicle having power transmission mechanism, a rake frame disposed at one side of and coupled to said motor operated vehicle, a raking element carried by said frame, and a shaft journaled upon said frame, said shaft being operatively connected with said raking element and with the power transmission mechanism of said motor operated vehicle.

4. In combination, a motor operated vehicle having power transmission mechanism, a rake frame disposed at one side of said motor operated vehicle and inclined forward and outward relative to its line of travel, draft members connecting said frame with said motor operated vehicle, a rotatable raking element carried by said frame, and operative connections between said raking element and the power transmission mechanism of said motor operated vehicle.

5. In combination, a motor operated vehicle having power transmission gearing, a rake frame disposed at one side of said motor operated vehicle, draft members connecting said frame with said motor operating vehicle, a raking cylinder carried by said frame and including an axial shaft, and a transversely disposed shaft having one end operatively connected with said power transmission gearing and its opposite end with said axial shaft.

6. In combination, a motor operated vehicle having power transmission gearing, a rake frame disposed at one side of said motor operated vehicle and inclined forward and outward relative to its line of draft, a caster wheel carrying said frame, draft members connecting said frame with said motor operated vehicle, a rotatable raking element carried by said frame and operative to deliver a windrow in rear of said motor operated vehicle, and a transversely disposed shaft having one end operatively connected with said power transmission gearing and its opposite end with said rotatable raking element.

7. In combination, a motor operated vehicle having power transmission mechanism, a hay treating member, means for connecting said member to said motor operated vehicle for draft purposes, and means for connecting said member to the power transmission on said motor operated vehicle for driving the hay treating member whether it is stationary or is being propelled.

In testimony whereof I affix my signature.

EDWARD W. BURGESS.